United States Patent
Nuzman et al.

(10) Patent No.: US 7,885,803 B2
(45) Date of Patent: Feb. 8, 2011

(54) SYSTEM AND METHOD FOR SIMULATING TRAFFIC LOADS IN PACKETIZED COMMUNICATION NETWORKS

(75) Inventors: Carl J. Nuzman, Union, NJ (US); Iraj Saniee, New Providence, NJ (US); Alan A. Weiss, Millburn, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1169 days.

(21) Appl. No.: 10/446,370

(22) Filed: May 28, 2003

(65) Prior Publication Data

US 2004/0240387 A1 Dec. 2, 2004

(51) Int. Cl.
G06F 9/44 (2006.01)
G06F 9/455 (2006.01)
G06F 13/10 (2006.01)
G06F 13/12 (2006.01)
G06F 15/16 (2006.01)
G06F 15/163 (2006.01)

(52) U.S. Cl. .............................. 703/21; 703/2; 709/203; 709/232

(58) Field of Classification Search .................. 709/203, 709/232, 235; 370/230, 252, 412, 428; 703/21
See application file for complete search history.

(56) References Cited

U.S. PATENT DOCUMENTS 6,526,295 B1 * 2/2003 Shull ........................... 455/574
6,772,107 B1 * 8/2004 La Cascia et al. .............. 703/21
6,823,051 B1 * 11/2004 Thomas et al. ......... 379/112.01

OTHER PUBLICATIONS

Carl J. Nuzman, Iraj Saniee, Wim Sweldens, Alan Weiss, "A Compound Model for TCP Connection Arrivals", Mar. 2000.*
Carl J. Nuzman, Iraj Saniee, Wim Sweldens, Alan Weiss, "A Compound Model for TCP Connection Arrivals for LAN and WAN Applications", Oct. 4, 2002.*
Erramilli et al. "Fast and Physically-Based Generation o f Self-Similar Network Traffic With Applications to ATM Performance Evaluation", IEEE, 29$^{th}$ conference on Winter simulation, 1997, pp. 997-1004.*
Zukerman et al. "Internet Traffic Modeling and Future Technology Implications", Mar. 30, 2003, IEEE Infocom, 10 pages.*
Neame, Timothy, "Characterisation and Modelling of Internet Traffic Streams", Feb. 2003, 239 pages.*
Feldmann, Anja. "Chracteristics of TCP Connection Arrivals", Dec. 3, 1998, 20 pages.*

(Continued)

*Primary Examiner*—Kamini S Shah
*Assistant Examiner*—Suzanne Lo
(74) *Attorney, Agent, or Firm*—Hitt Gaines, PC

(57) ABSTRACT

A system for, and method of, simulating traffic loads in a packetized communication network. In one embodiment, the system includes: (1) an initial arrival generator that generates an initial arrival for a simulated user session at an independent time from a previous user session arrival and (2) a subsequent arrival generator, associated with the initial arrival generator, that generates a number of connections to be associated with the simulated user session as an independent variable and, if the number of connections is greater than one, generates a mean connection interarrival time for the simulated user session and a plurality of timings of subsequent arrivals.

20 Claims, 10 Drawing Sheets

OTHER PUBLICATIONS

Willinger, et al.; "Self-Similarity and Heavy Tails: Structural Modeling of Network Traffic" in a Practical Guide to Heavy tails: Statistical Techniques and Applications; pp. 27-53; 1998.

Fowler, et al.; "Local Area Network Traffic Characteristics, with Implications for Broadband Network Congestion Management" IEEE Journal on Selected Areas on Communications, vol. 9, No. 2, Sep. 1991; pp. 1139-1149.

Mandelbrot, "Self-Similar Error Clusters in Communication Systems and the Concept of Conditional Stationarity" IEEE Transactions on Communication Technology; pp. 71-90; 1965.

Elwalid, et al. "Fundamental Bounds and Approximations for ATM Multiplexers with Applications to Video Teleconferencing" IEEE Journal on Selected Areas in Communications; vol. 13, No. 6; Aug. 1995; pp. 1004-1016.

Paxson, et al. "Wide Area Traffic: The Failure of Poisson Modeling" IEEE/ACM Transactions on Networking, vol. 3, No. 3, Jun. 1995; pp. 226-244.

Erramilli, et al. "Experimental Queueing Analysis with Long-range Dependent Packet Traffic" IEEE/ACM Transactions on Networking; vol. 4, No. 2; Apr. 1996; pp. 209-223.

Ryu, et al. "The Importance of Long-Range Dependence of VBR Video Traffic in ATM Traffic Engineering: Myths and Realities" in Proc. ACM/SIGCOMM, pp. 3-14; 1996.

Cao, et al. "On the Nonstationarity of Internet Traffic" in Proc. ACM Sigmetrics; pp. 102-112; 2001.

Lowen, et al. "Power-Law Shot Noise" IEEE Transactions on Information Theory; vol. 36, No. 6, Nov. 1990; pp. 1302-1318.

Lowen, et al. "Doubly Stochastic Poisson Point Process driven by Fractal Shot Noise" Physical Review A, vol. 43, No. 8; Apr. 1990; pp. 4192-4215.

Rice, "Mathematical Analysis of Random Noise" Bell System Technical Journal, 23:1-51; 1945; (Reprinted in Selected Papers on Noise and Stochastic Processes,) 1954; pp. 133-294.

Gilbert, et al. "Amplitude Distribution of Shot Noise" Bell Systems Technical Journal; 1960; pp. 333-350.

Leland, et al., "On the Self Similar Nature of Ethernet Traffic" IEEE/ACM Transactions on Networking 2(1), Feb. 1994.

Sherman, et al., "Proof of a Fundamental Result in Self-Similar Traffic Modeling" ACM SIGCOM, Computer Communications Review, 1998.

Crovella, et al., "Self-Similarity in World Wide Web Traffic: Evidence and Possible Causes" Proc. 1996 ACM Sigmetrics Conference, May 1996.

Feldmann, et al., "Dynamics of IP Traffic: A Study of the Role of Variability and the Impact of Control" Proceedings of the ACM/SIGCOMM, 1999.

Erramilli, et al., "Performance Impacts of Multi-Scaling in Wide Area TCP/IP Traffic" IEEE Infocom 2000, Mar. 2000.

Barford, et al., "Generating Representative Web Workloads for Network and Server Performance Evaluation" ACM SIGMETRICS '98, pp. 151-160, Jun. 1998.

* cited by examiner

SYSTEM AND METHOD FOR SIMULATING TRAFFIC LOADS IN PACKETIZED COMMUNICATION NETWORKS

TECHNICAL FIELD OF THE INVENTION

The present invention is directed, in general, to test equipment for packetized communication networks and, more specifically, to a system and method for simulating traffic loads in packetized communication networks.

BACKGROUND OF THE INVENTION

The development of data networking in the 1960s, first as an academic exercise, and subsequently as a means of providing a host of new services, presents new challenges and opportunities to the well-established field of teletraffic theory. Apart from a few pioneering investigations, such as Mandelbrot ("Self-similar Error Clusters in Communication Systems and the Concept of Conditional Stationarity," IEEE Trans. Communication Technology, pages 71-90, 1965), some of the features that distinguish data traffic from voice telephony were noticed as early as the late 1980s (see, e.g., Fowler, et al., "Local Area Network Traffic Characteristics with Implications for Broadband Network Congestion Management," IEEE J. Select. Ar. Comm., 9(7):1139-1149, 1991; and Meier-Hellstern, et al., Traffic Models for ISDN Data Users: Office Automation Application," in ITC-13, Copenhagen, pages 167-172, 1991, both incorporated herein by reference). In their pioneering study of Local Area Network (LAN) traffic, Leland, et al., "On the Self Similar Nature of Ethernet Traffic" (extended version), IEEE/ACM Transactions on Networking, 2(1), February 1994 (incorporated herein by reference in its entirety) presented data and argued for use of alternative models. By showing that sufficiently aggregated data traffic exhibited self-similarity over a wide range of time scales, the authors argued for the use of fractal models and, more explicitly, use of statistical processes exhibiting long-range dependence (LRD). In subsequent reports (e.g., Sherman, et al., "Proof of a Fundamental Result in Self-similar Traffic Modeling," ACM SIGCOM, Computer Communications Review, 1998, incorporated herein by reference in its entirety), the authors contended that the underlying cause of self-similarity was effectively unrelated to the mechanisms of data transmission and was instead exclusively due to the nature of aggregated load. Unlike voice, individual streams of load in data networks followed distributions with heavy tails, the aggregation of which, it was argued, gave rise to its observed self-similarity. Cox (see, Cox, et al., *Point Processes*, Chapman and Hall, 1980; and Cox, "Long-range Dependence: A Review," in *Statistics: An Appraisal, pages 55-74*, Iowa State University Press, 1984, both incorporated herein by reference) had given a related theoretical model for long-range dependence, namely an "M/G/Go queue" with heavy tailed service times.

Many of the succeeding investigations (for Web data, notably Crovella, et al., "Self-similarity in World Wide Web Traffic: Evidence and Possible Causes," Proc. 1996 ACM Sigmetrics conference, May 1996; and Paxson, et al., "Wide-area Traffic: the Failure of Poisson Modeling," IEEE/ACM Transactions on Networking, 3(3):226-244, June 1995, both incorporated herein by reference in their entirety) have followed the same general methodology. This consists of counting bytes and packets carried over identical non-overlapping time intervals and studying the general behavior of this process as the aggregation interval is increased both spatially and temporally.

Some studies of the impact of self-similarity on the performance of switching systems have argued in favor of the self-similar approach (e.g., Erramilli, et al., "Experimental Queueing Analysis with Long-range Dependent Packet Traffic," IEEE/ACM Trans. on Networking, 4:209-223, 1996, incorporated herein by reference), while others have argued against it (e.g., Elwalid, et al., "Fundamental Bounds and Approximations for ATM Multiplexers with Applications to Video Teleconferencing," IEEE J. Select. Ar. Comm., 13:1004-1016, 1995; and Ryu, et al., "The Importance of Long-range Dependence of VBR Video Traffic in ATM Traffic Engineering: Myths and Realities," in Proc. ACM/SIGCOMM, pages 3-14, 1996, both incorporated by reference).

The latter studies argued that the short-term correlation in data traffic could capture much, if not all, of the performance impacts attributed to self-similarity. Followup work in this direction has concentrated on demonstration and causes of multi-fractality in low aggregate Web traffic (e.g., Feldmann, et al., "Dynamics of IP Traffic: a Study of the Role of Variability and the Impact of Control," in Proceedings of the ACM/SIGCOMM, 1999, incorporated herein by reference in its entirety) and potential performance impacts of multi-fractality (e.g., Erramilli, et al., "Performance Impacts of Multi-scaling in Wide Area TCP/IP Traffic," in IEEE Infocom 2000, March 2000, incorporated herein by reference in its entirety).

TCP connection arrival processes from various data sets were classified according to source application in Paxson, et al., supra. Here it was observed that protocols such as TELNET that tend to generate a single connection per "user session" are well modeled by Poisson processes, whereas applications such as HTTP and X11 which may generate multiple connections per "user session" are not.

Since the routers, hubs, gateways and other equipment used in packetized communication networks must perform reliably so as not to compromise network operation, and since traffic load simulation provides a vital way to test such equipment before it is installed in a network, still further improvement is needed with respect to systems and methods for simulating traffic loads so that the traffic they simulate more accurately represents the actual traffic the equipment would encounter under actual operating conditions.

SUMMARY OF THE INVENTION

It has come to be recognized that, if the underlying user sessions could be observed, such sessions would follow a Poisson arrival process. Accordingly, the present invention provides, a system for, and method of, simulating traffic loads in a packetized communication network. In one embodiment, the system includes an initial arrival generator that generates an initial arrival for a simulated user session at an independent time from a previous user session arrival. The system further includes a subsequent arrival generator, associated with the initial arrival generator, that generates a number of connections to be associated with the simulated user session as an independent variable and, if the number of connections is greater than one, generates a mean connection interarrival time for the simulated user session and a plurality of timings of subsequent arrivals.

For purposes of the present invention, a "user session" is a set of connections generated by a user or a computer in a single active period. Those skilled in the pertinent art generally understand what a user session is.

The concept of user sessions ("user equivalents") is also central to the SURGE model used to simulate the workload of HTTP servers (see, e.g., Barford, et al., "Generating Representative Web Workloads for Network and Server Performance Evaluation," in ACM SIGMETRICS '98, pages 151-160, June 1998, incorporated herein by reference).

High-resolution packet data, collected at one Bell Labs facility, is used to provide evidence for the correctness of the user session concept. It will be shown that the teachings of the present invention are useful for analyzing the traffic, and that they can be used to develop simple, accurate and efficient models for TCP connection arrivals. In this analysis phase, TCP connections are grouped into user sessions, and then distributions of measurements such as the number of connections per user session analyzed. It has been found that the user sessions arrivals followed a Poisson process, while per session measurements tend to be heavy-tailed. Synthetic traffic traces can then be generated from a simple, two-layer model, using a small number of parameters determined by the measurements in the analysis phase. After empirically verifying the accuracy of the model, some of its theoretical properties will be analyzed. It will be shown that the M/G/∞ queue generalizes in the shot noise framework, which will shed light on the way in which long-range dependence can arise.

In contrast to the count processes used extensively in the prior art to study self-similar and multi-fractal phenomena, arrival processes at the user session and connection layers form the basis of analysis herein. The arrival processes can readily be converted to count processes as needed. The data studied herein and the resulting model agree with the observation made in Feldmann, "Characteristics of TCP Connection Arrivals," in Self-Similar Network Traffic and Performance Evaluation, Wiley, New York, 2000, that the interarrival times for TCP connections are subexponential and well-modeled by Weibull distributions (when significant HTTP traffic is present). In addition, it will be shown that the sequence of interarrival times is long-range dependent, in the data and in the model presented here. As reported extensively in Cao, et al., supra, the relative amplitude of this long-range dependence diminishes as traffic is aggregated spatially; this is also true in the model presented here.

The following will be undertaken herein:

(1) User session groupings will be inferred from TCP packet headers, and the appropriateness of a Poisson model for these sessions will be verified.

(2) A model of TCP connection arrivals within a user session will be provided using a newly defined biPareto distribution.

(3) A verification will be made that this compound model agrees with measurement.

(4) The model will be shown to extend to characteristics of large-scale aggregation observed in traffic in the network core.

(5) The model will be placed in a general shot noise framework.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Model-Based Measurements

Data Set

Figure 1:
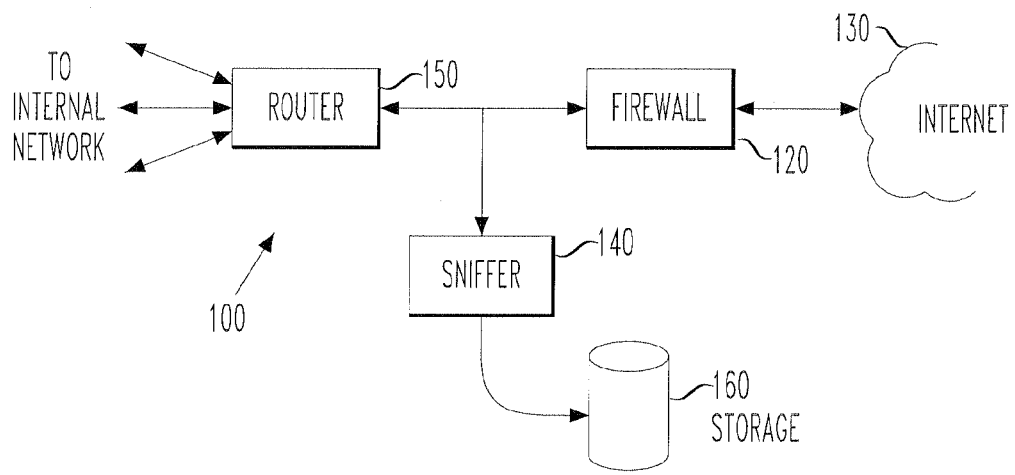
FIG. 1 illustrates a highly schematic block diagram of a data collection system used to collect traffic data to analyze.

The data was collected by a system at Bell Laboratories in Murray Hill, N.J. (Cao, et al., "On the Nonstationarity of Internet Traffic," in Proc. ACM Sigmetrics, pages 102-112, 2001, incorporated herein by reference). As pictured in FIG. 1, the math and computer science research center at Bell Labs, generally designated 100, is connected to the Internet 130 through a firewall 120. The firewall 120 connects to the center 100 via a router 150; the data was collected from a link between the router 150 and the firewall 120. A packet sniffer 140 recorded all the packet headers and delivered the packet headers to storage 160. The data comes from a 27-hour period beginning the evening of Nov. 17, 1998.

Two subsets of the data were analyzed:
1. All the Transmission Control Protocol (TCP) data. This amounted to 72% of the packets; almost all the rest were Unreliable Data Protocol (UDP).
2. HyperText Transfer Protocol (HTTP) data between 10 AM and 5 PM. This allows a stationary model to be assumed and a single type of traffic focused upon. The majority of TCP packets in the trace are HTTP.

Note that the data represents carried traffic (closed loop), while the model described herein offers traffic (open loop), ignoring the effects of vagaries in the Internet. The justification for this is that the firewall, at least, was lightly loaded, so that any congestion was due to other links in the network. Also, it is very difficult to infer the effect of the TCP control algorithm on traffic.

The model described herein has a Poisson process of user session arrivals at the top level. Based on this model, the important quantities that must be measured or estimated include the arrival rate λ of user sessions, the joint distribution of user session duration and rate, and the mechanism by which each user session generates connections. Each of these measurements are discussed in turn below.

Definition and Characterization of User Sessions

Figure 2:
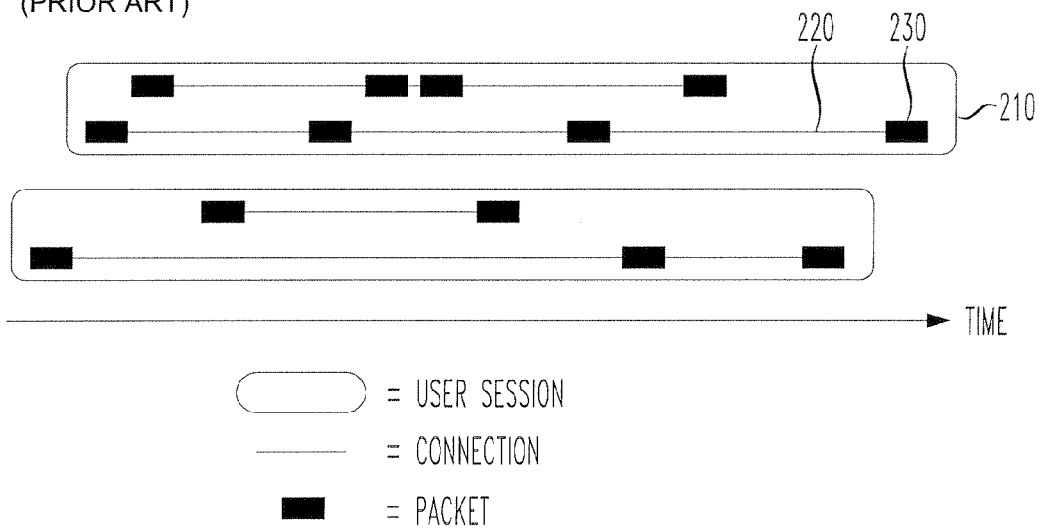
FIG. 2 illustrates a schematic diagram of user sessions, TCP connections and packets.

FIG. 2 graphically illustrates the relationship among user sessions 210, connections 220 and individual packets 230. The grouping of IP packets into TCP connections is determined by the TCP protocol. However, the way in which TCP connections should be combined into user sessions is a matter of choice. The definition of "user session" employed herein was based only on information contained in the TCP and IP packet headers. For each TCP connection, the host IP address initiating the connection was defined to be the user for that connection. The TCP connections corresponding to a given user were then grouped into user sessions as follows:

A user session begins when a user who has been idle opens a TCP connection.

A user session ends, and the next idle period begins, when the user has had no open connections for t consecutive seconds.

This method has the problem that different users sharing the same machine cannot be distinguished, and this can lead to extremely long "user" sessions on shared machines.

For purposes of the examples set forth below, τ=100 seconds, so that periods of HTTP activity separated by more than a couple of minutes were considered to be separate user sessions. Also tried, though not described herein in detail, are values of τ higher than 100 seconds, including 10 minutes and one hour. The qualitative results of the study do not depend on the particular choice of τ, although some quantitative factors such as the arrival rate of user sessions do vary with τ.

Using the above definition for user sessions, it was determined that the user session arrival process is consistent with a Poisson process with a very slow (diurnal) variation in arrival rate. The arrivals came faster during the day than at night, but the rate was approximately constant over periods of a few hours. It has been found that the interarrival times were exponentially distributed, and that various transformations of the interarrival process were uncorrelated.

Structure of Connection Arrivals

From this point forward, the focus is on approximately 4000 HTTP user sessions initiated between 9 AM and 5 PM. The model of connection arrival within a user session is split into two parts based on the data, not based on expectations of the model. In any user session, C is defined as the number of TCP connections that are part of that user session.

If C>1, two additional statistics are defined. T is the total interarrival time—the time from the first connection arrival to the last connection arrival. The "average connection interarrival time" is defined to be $\mu=T/C-1$. Note that the timing of connection arrivals is not addressed by C and μ; this will be addressed below.

Model Statistics for Connection Interarrivals

Figure 3:
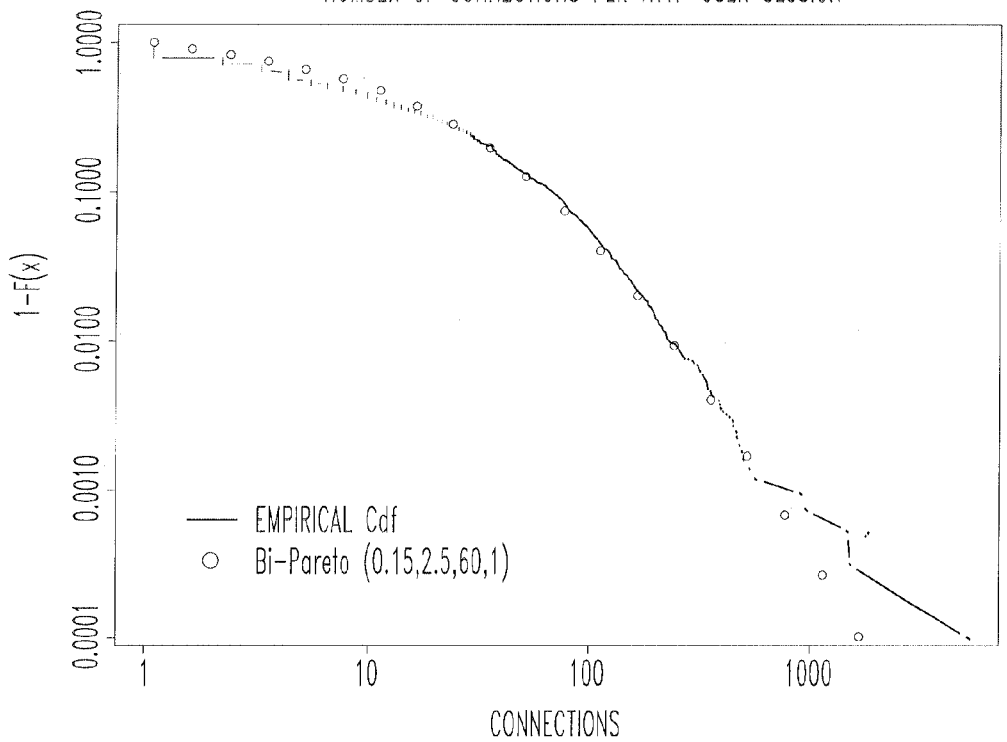
FIG. 3 illustrates a graphical representation of an empirical tail distribution and biPareto fit of C, the number of connections per user session.
Figure 4:
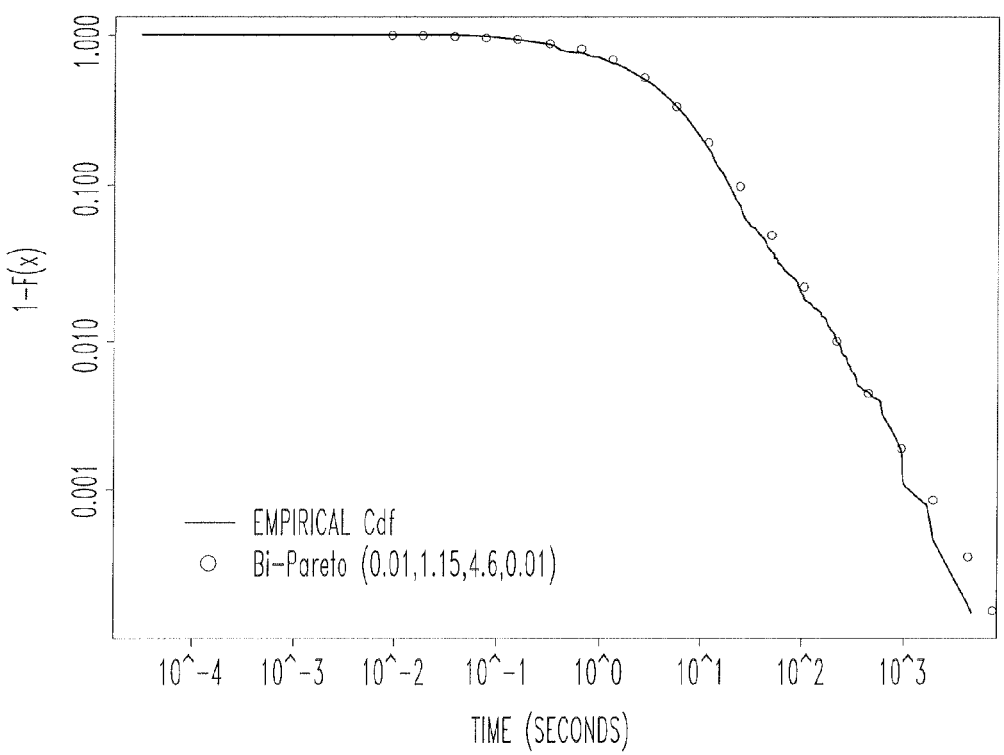
FIG. 4 illustrates a graphical representation of an empirical tail distribution and biPareto fit of $\mu$, the mean connection interarrival time within a user session.

FIG. 3 shows the tail distribution function of C, the number of connections generated by a user session. FIG. 4 shows the tail distribution of μ. Note that on these log-log plots, a distribution of the form $1-F(x)=x^{-\alpha}$ would appear as a straight line with slope $-\alpha$. FIG. 4 contains two nearly linear regimes, with a smooth transition between them. FIG. 3 appears to contain two regimes, although the regime on the left is never linear.

If the entire plot were almost linear, the distribution could be modeled by a Pareto distribution. A Pareto distribution has a cumulative distribution function $$\text{Pareto}(\alpha, k): F(x) = 1 - \left(\frac{x}{k}\right)^{-\alpha}, x \geq k.$$

The decay exponent a must be strictly positive, and the $v^{th}$ order moment will exist if and only if $\alpha > v$. In particular, the mean and variance are defined when $\alpha>1$ and $\alpha>2$, respectively. The mean is given by $k\alpha/(\alpha-1)$ and the variance is given by $$k^2 \frac{\alpha}{(\alpha-1)^2(\alpha-2)}.$$

The k corresponds simply to scaling: multiplying a Pareto(k, α) random variable by a results in a Pareto(ak,α) variable. k is restricted to be finite and strictly positive. The probability density function of the Pareto distribution is given by $$f(x) = \alpha k^{\alpha} x^{-\alpha-1}, x > k,$$

and the tail distribution function is given by $$1 - F(x) = \begin{cases} \left(\frac{x}{k}\right)^{-\alpha} & x > k \\ 1 & x \leq k \end{cases}$$

where the parameters $\alpha>0$ and $k>0$ are the decay exponent and scale parameter, respectively. The scale parameter is also the minimum possible value of the random variable.

To give the flexibility needed to model empirical distributions such as that in FIG. 4 effectively, a "biPareto" distribution will be defined. A biPareto distribution has a cumulative distribution function $$\text{biPareto}(\alpha, \beta, c, k): F(x) = 1 - \left(\frac{x}{k}\right)^{-\alpha} \left(\frac{x/k+c}{1+c}\right)^{\alpha-\beta}, x \geq k.$$

The distribution looks like a Pareto(α,k) distribution for small values of x and like a Pareto(β,k(1+c)$^{1-\alpha/\beta}$) distribution in the tail. The parameter c marks the boundary between the two types of behavior.

The probability density function of the biPareto distribution is given by $$f(x) = k^\beta (1+c)^{\beta-\alpha} x^{-\alpha-1} (x+kc)^{\alpha-\beta-1} (\beta x + \alpha kc), x > k.$$

$\beta > 0$, $c \geq 0$ and $k > 0$ are restrictions that should be apparent to those skilled in the pertinent art. The initial exponent must satisfy $\alpha \geq -\beta/c$ and hence can be negative in general. With respect to the applications described herein, $0 < \alpha < \beta$.

Because the tail is like that of a Pareto distribution with a decay exponent $\beta$, the $v^{th}$ order moments occur if and only if $\beta > v$. The k parameter is related to scaling just as for the Pareto distribution. On the log-log plot, changing k shifts the graph to the left or right.

To examine special cases of the distribution, it is useful to rewrite the cumulative distribution function as $$F(x) = 1 - k^\beta (1+c)^{\beta-\alpha} x^{-\alpha} (x+kc)^{\alpha-\beta}, x \geq k.$$

Then the following special cases and distributional limits become clear:

biPareto$(\alpha, \beta, 0, k)$ = Pareto$(\beta, k)$ $\lim_{c \to \infty}$ biPareto$(\alpha, \beta, c, k)$ = Pareto$(\alpha, k)$ biPareto$(\alpha, \alpha, c, k)$ = Pareto$(\alpha, k)$ $\lim_{k \to -}$ biPareto$(0, \beta, b/k, k)$ = ParetoII$(\beta, b)$ The ParetoII distribution has the cumulative distribution function $$F(x) = 1 - (x/b + 1)^{-\beta}, x \geq 0.$$

A bi-Pareto distribution has a tail distribution function given by $$1 - F(x) = \begin{cases} \left(\frac{x}{k}\right)^{-\alpha} \left(\frac{x+kb}{k+kb}\right)^{\alpha-\beta} & x > k \\ 1 & x \leq k \end{cases}$$

The minimum possible value of such a random variable is the scale parameter $k > 0$. From this point, the tail distribution initially decays as a power law with exponent $\alpha > 0$. Then, in the vicinity of a breakpoint kb (with b>0), the decay exponent gradually changes to b>0.

The circles in FIGS. 3 and 4 show the tail distribution function of biPareto distributions matched to the empirical distributions. The parameters of the matching distribution are listed on the plots in the order ($\alpha, b, kb, k$). The fit between the measured data and the biPareto distributions is excellent.

Figure 5:
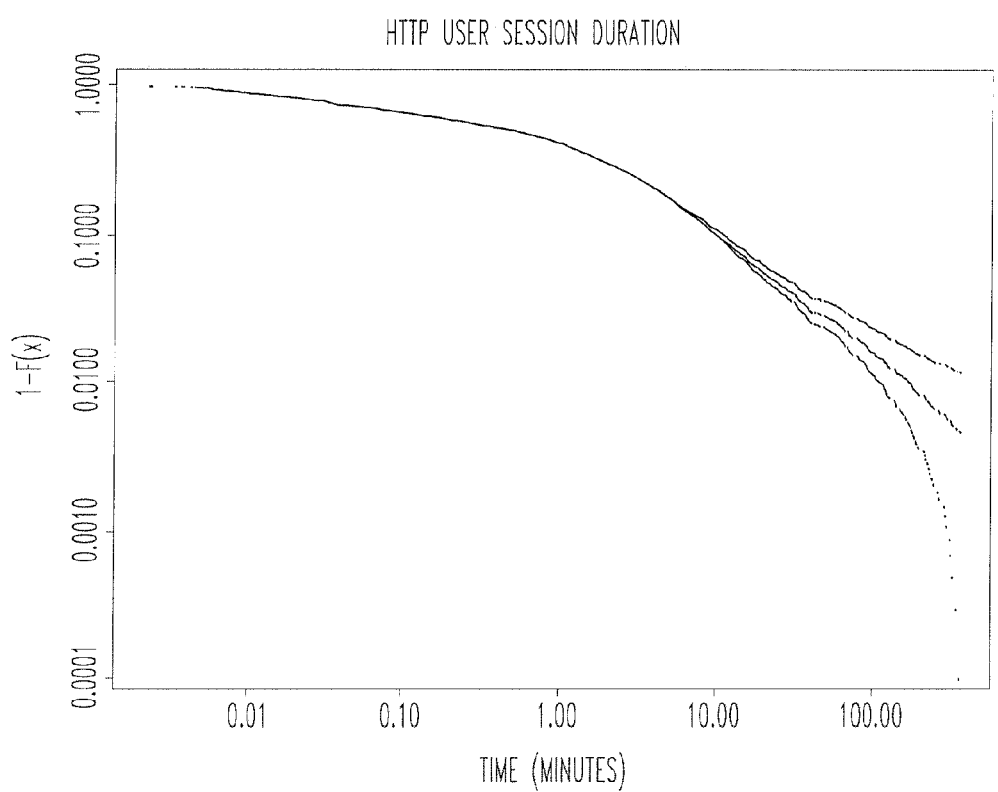
FIG. 5 illustrates a graphical representation of an empirical tail distribution of user session duration D and two hypothetical uncensored distributions.

Some measured parameters of the traffic trace seemed to be drawn from a censored biPareto distribution, namely the distribution that results from discarding realizations of a biPareto distribution above a given threshold. An example is the duration T, in seconds, of user sessions. The lowest curve in FIG. 5 is the empirical tail distribution function of user session duration. Three linear regions are found in the log-log plot; the extreme tail appears to be asymptotic to a vertical line at T≈600 minutes, suggesting that the distribution does not allow observations above this level.

Suppose that a random variable X with tail distribution $\overline{F}(x)$ is censored by throwing out realizations greater than some threshold $X_0$. The resulting tail distribution is truncated to $$\overline{F}^*(x) = P(X > x | x < X_0) = \frac{\overline{F}(x) - \overline{F}(X_0)}{1 - \overline{F}(X_0)}, x < X_0$$

Given the "censoring probability" $\overline{F}(X_0)$, the original distribution $\overline{F}$ (on $x < X_0$) can be recovered from $\overline{F}^*$ as $$\overline{F}(x) = \overline{F}(X_0) + (1 - \overline{F}(X_0)) \overline{F}^*(x).$$

Figure 6:
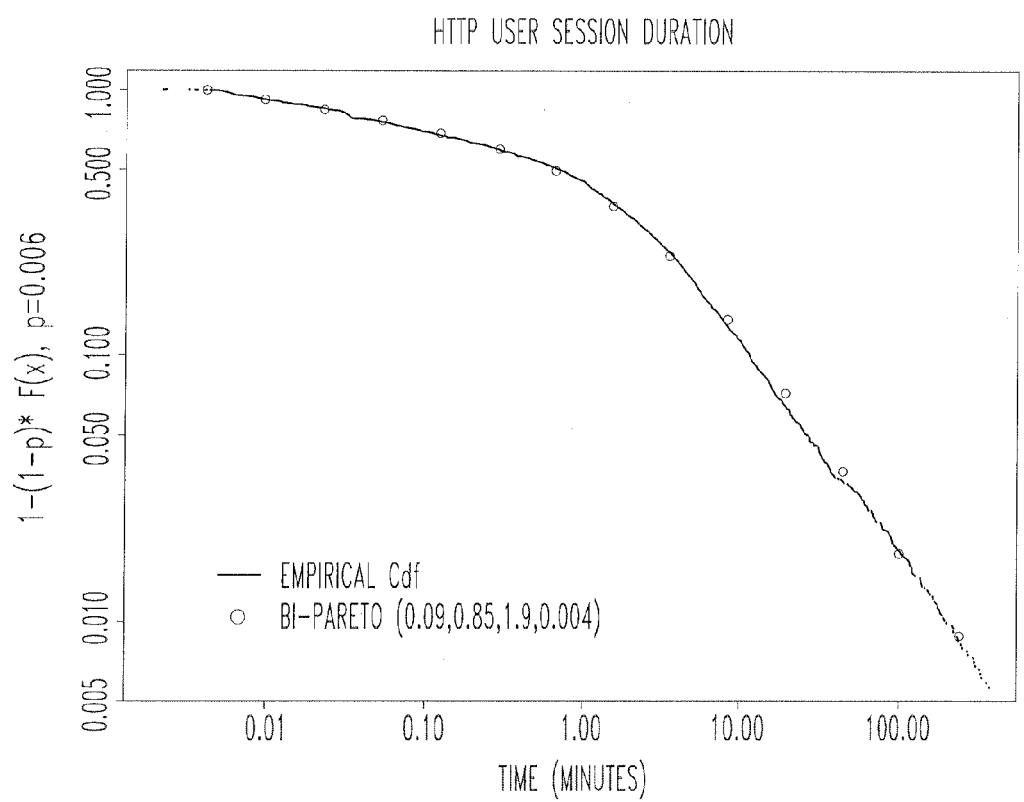
FIG. 6 illustrates a graphical representation of an empirical estimate of the uncensored tail distribution of user session of duration D and a biPareto fit.

Suppose that the observations recorded in the lower curve in FIG. 5 are drawn from a censored distribution $\overline{F}^*$. The two upper curves in FIG. 6 show two different estimates of $\overline{F}(x)$ based on the censoring probability estimate $\overline{F}(T_0) = 0.012$ for the upper curve and $\overline{F}(T_0) = 0.006$ for the middle curve. The middle curve is asymptotically straight, indicating that a biPareto fit could be appropriate. The empirical $\overline{F}^*$ based on the estimate $\overline{F}(T_0) = 0.006$ is then plotted against a biPareto fit in FIG. 6. In the upper curve of FIG. 5, the tail is convex, indicating that 0.012 is too high an estimate of the censoring probability.

When working with heavy-tailed data, a censored model may sometimes be appropriate, even when no obvious truncation is apparent. Suppose for example that N realizations of a random variable are observed, and that the tail distribution shows a clear power-law decay down to observable probabilities on the order of 1/N. Based on the observations, a model could be formed with an infinite power law tail, or perhaps censored to some value greater than the largest observed value.

Suppose that the model is used to generate K synthetic realizations. If K<<N, the two models would most likely generate similar values. However, if K>>N, the uncensored model will produce a number of realizations which are much larger than any of the observed values.

In this case, the choice of model should depend on physical intuition, the question being whether it is reasonable for the tail to extend infinitely, or whether mechanisms exist in the system that would limit maximum values. Possible censoring mechanisms could include finite data collection windows, hardware speed and memory limitations, and thresholds specified by communication protocols.

Independence of C and $\mu$

To fully characterize the user session parameters such as C, $\mu$ and T, not only their marginal distributions should be described, but also their joint distributions. Although T is strongly correlated with both $\mu$ and C, the relationship between $\mu$ and C is much weaker. The correlation coefficient between $\mu$ and C was measured to be only −0.013 in the data set. The mean of $\mu$ was also examined, conditioned on various ranges of C. Here again, a weak inverse relationship between $\mu$ and C was found.

In the model, C and $\mu$ are defined to be mutually independent random variables. This simplification appears to have a relatively minor effect on the effectiveness of the model. If more careful modeling is required later, one approach would be to define a few different condition distributions for $\mu$ conditioned on ranges of C.

Connection Arrivals within a User Session

In the model described thus far, user sessions arrive according to a Poisson process, and the $i^{th}$ user session is assigned a number of connections $C_i$ and a total connection arrival time $T_i = \mu_i (C_i - 1)$, where $C_i$ and $\mu_i$ are drawn independently from biPareto distributions. The last step is to model the way in which the connections are distributed within a user sessions.

Physical intuition and qualitative examination of the data suggest that the arrival of connections within a user session will be complex. For example, when opening a Web page, typical browsers will open as many as four simultaneous TCP connections for text and images, generating very closely spaced connection arrivals. Along with these machine-driven dynamics, there are also slower dynamics based on the behavior of the human user.

Rather than attempting to model these effects explicitly, a simple approach based on a renewal process was taken. Given C and T, the C−1 interarrival times $\{X_j\}$ for a given user session were defined to be $$X_j = T \frac{Z_j}{\sum_{k=1}^{C-1} Z_k}, \ j \in \{1, \ldots, C-1\}$$

where the $Z_k$ are positive, i.i.d. random variables. That is, C arrivals from a renewal process are scaled to span exactly T seconds. For the distribution function of the $Z_k$, a Weibull distribution with parameter c<1 was chosen.

The Weibull distribution was used because it is a commonly observed interarrival distribution (see, e.g., Johnson, et al., *Distributions in Statistics: Continuous Univariate Distributions*, Wiley Interscience Publication, 1975; and Feldmann, et al., supra, and because its coefficient of variation (ratio of the standard deviation to the mean) can be adjusted using the shape parameter, c. In the synthesis described below, c=0.48 so that the coefficient of variation matched the measured average coefficient of variation for intra-session connection interarrival times.

The properties of the synthesized model appear to be fairly robust to changes in the distribution chosen for the $Z_k$. For example, it has been found that increasing the coefficient of variation of the $Z_k$ tends to increase the coefficient of variation of the overall interarrival times, but that large changes in $Z_k$ are required to effect significant changes overall.

Synthesized Connection Arrivals

To test the appropriateness of the connection arrival model, the model was used to generate synthetic connection arrivals. The rate of the user session arrival process, the parameters of the biPareto distributions of C and μ, and the coefficient of variation of the within-session interarrivals were all matched to measurements from the data as described above.

Figure 7:
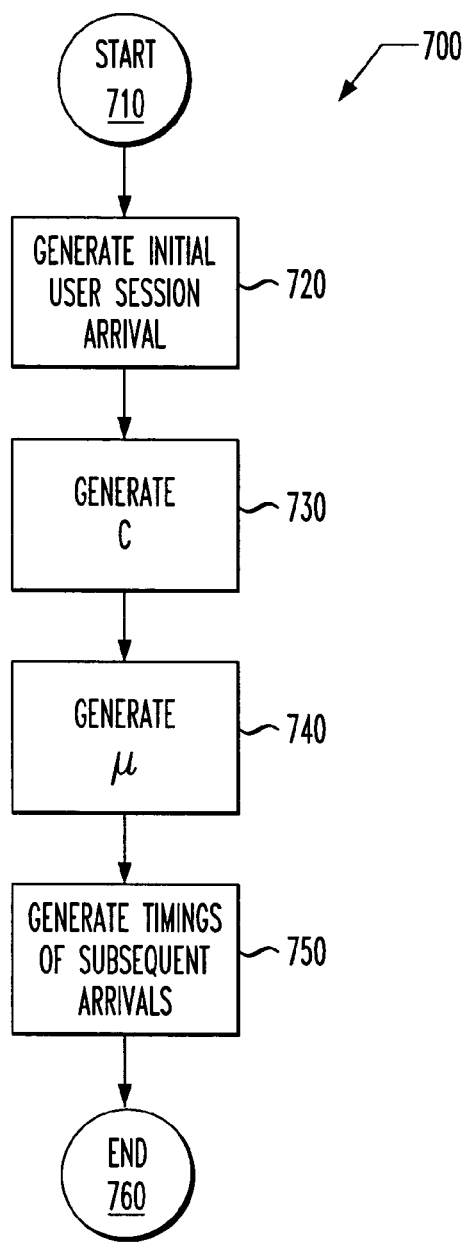
FIG. 7 illustrates a flow diagram of one embodiment of a method of simulating traffic loads in a packetized communication network carried out according to the principles of the present invention.
Figure 8:
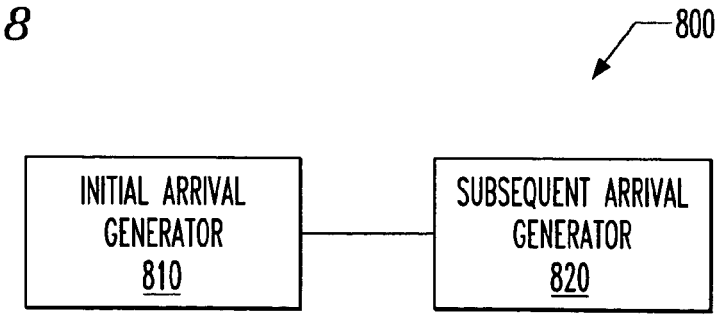
FIG. 8 illustrates a block diagram of one embodiment of a system for simulating traffic loads in a packetized communication network constructed according to the principles of the present invention.

A method employed to generate synthetic arrivals will now be described in general with reference to FIG. 7. The method, generally designated 700, begins in a start step 710 when it is desired to simulate traffic in a packetized communication network. The method 700 proceeds to a step 720, in which a user session arrival is generated at an independent exponentially distributed time from the previous user session arrival. The method 700 then proceeds to a step 730, wherein C, the number of connections in this user session, is generated as an independent biPareto random variable.

Next, the method 700 proceeds to a step 740 wherein, if C>1, μ is generated as an independent biPareto random variable. Then, in a step 750, if C>1, C−1 independent Weibull random variables $Z_j$ are generated and scaled to $X_j$ as described above. Note that this uses the variable T=(C−1)μ. The $X_j$ represent the timings of connection arrivals. The method 700 ends in an end step 760.

Having described a general method, a specific, computer-implementable algorithm, expressed in pseudocode, for generating synthetic traffic loads will now be set forth. The algorithm generates a point process of events that can model TCP connections, for example. The events are generated in successive epochs of length t. That is, the algorithm first gives all of the events happening in [0;t), then the events in [t;2t), and so on indefinitely.

At each step, the algorithm takes as input historical information needed to generate events in the current epoch. The events for the current epoch are generated, and the historical information is updated to be used as input in the next epoch.

Global parameters to the algorithm are:
(1) an epoch granularity t, and
(2) a maximum memory multiplier M. The generated traffic will have no correlation beyond Mt.

Time-varying parameters may be constant for all time, or they may take different values in different epochs. Time-varying parameters for this algorithm are:
(1) the user session arrival rate ν,
(2) the distribution $F_C$ of the number of connections per user session, which takes values on the positive integers,
(3) the distribution $F_\mu$ of the average interconnection time within a user session, which takes positive values, and
(4) the within-user-session interarrival distribution $F_Z$, which takes positive values. The mean of this distribution is not significant, only its "shape."

Useful distributions for the above could include biPareto distributions for $F_C$ and $F_\mu$, and Weibull distributions for $F_Z$. The memory mulitplier M should preferably be chosen large enough so that P[Cμ>Mt] is small.

This algorithm produces a sequence of lists $L_0, L_1, \ldots$, where $L_k$ represents traffic events occurring in the time interval [kt; (k+1)t). Consider the loop that computes the list $L_k$ for the $k^{th}$ epoch. The input to this loop is a set of lists $\tilde{L}_k, \ldots, \tilde{L}_{k+m-1}$, computed in the previous loop. These lists give the events generated by user sessions originating in previous epochs. The output of the loop is the list $L_k$ and the set of lists $\tilde{L}_{k+1}, \ldots, \tilde{L}_{k+m}$ to be used by the next loop.

The algorithm is initialized by setting k=−M. The algorithm runs M loops in startup mode before it begins to produce output.

Main loop:
Choose the number N of user session arrivals in the current epoch, as N=⌊√(νt)G+νt⌋, where G is a zero-mean, unit variance normal random variable.
Pick user session arrivals offsets $A_i$ from a uniform distribution on [0;t), for i=1, ..., N.
Independently generate associated random variables $C_i$ and $\mu_i$ from distributions $F_C$ and $F_\mu$, respectively.
If k<0 (startup mode), discard all user sessions $(A_i, C_i, \mu_i)$ such that $kt+A_i+(C_i-1)\mu_i<0$.
Create an unsorted list, U, of all connection times generated by user sessions originating in this epoch.
Initialize U as an empty list.
For each user session $(A_i, C_i, \mu_i)$
  Set $X_0=0$.
  If $C_i>1$, then for j=1, ..., $C_{i-1}$, generate interarrival times $Z_j$ from distribution $F_Z$, and form the sums $$X_j = \sum_{m=1}^{j} Z_m.$$

For m=0, ..., $C_{i-1}$, define the arrival times $$B_m = kt + A_i + \frac{X_m}{X_{C_i-1}}(C_i - 1)\mu_i.$$

If k<0 (startup mode), discard all negative arrival times $B_m$<0.
Add the times $B_m$ to the list U.
Create a new empty list $\tilde{L}_{k+M}$.
For j=max{k,0}, ..., k+M, add to the list $\tilde{L}_j$ all of the elements of U that fall in the interval [jt, (j+1) t).
If k≧0, create the list $L_k$ by sorting the list $\tilde{L}_k$.
Set k=k+1, and repeat the main loop.

A system for simulating traffic loads in a packetized communication network will now be described. The system, generally designated 800, includes an initial arrival generator 810. The initial arrival generator 810 generates an initial arrival for a simulated user session at an independent time from a previous user session arrival. The time may be an exponentially distributed time as described above.

The system 800 further includes a subsequent arrival generator 820. The subsequent arrival generator 820 is associated with the initial arrival generator 810 and generates a number of connections to be associated with the simulated user session as an independent variable. The number of connections may be an independent random biPareto variable as described above.

If the number of connections is greater than one, the subsequent arrival generator 820 generates a mean connection interarrival time for the simulated user session and a plurality of timings of subsequent arrivals. The plurality of timings advantageously numbers one less than the number of connections. The plurality of timings may be independent Weibull random variables as described above. Further, the plurality of timings may be scaled to conform to a specified period of time. Finally, the subsequent arrival generator 820 may generate subsequent arrivals based on a sorted list of the plurality of timings in the manner described above.

Figure 9:
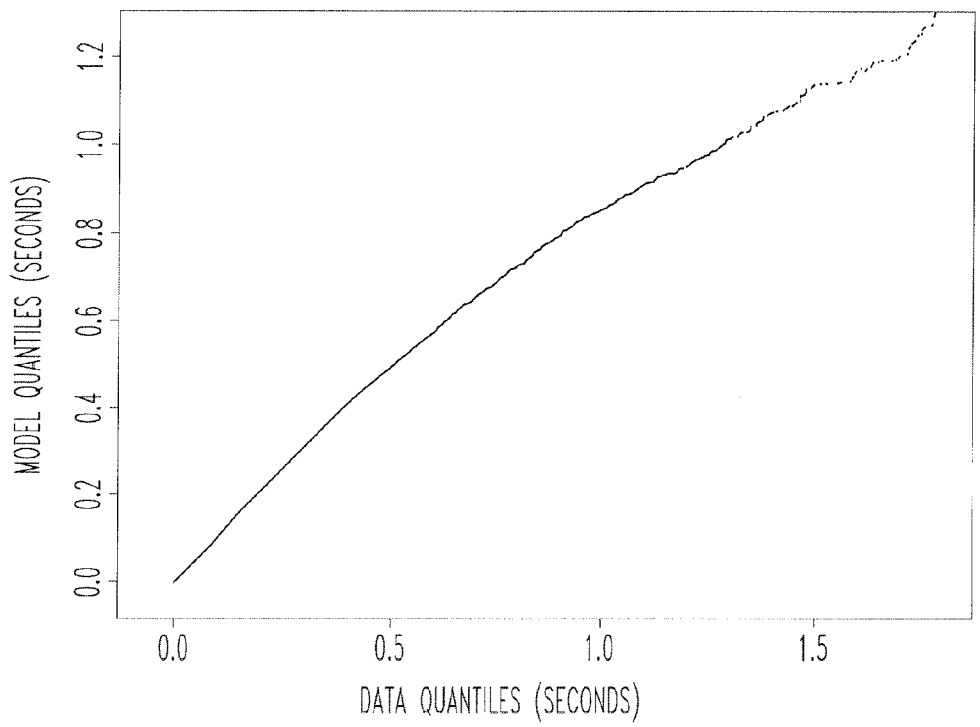
FIG. 9 illustrates a graphical representation of a fit of synthesized TCP connection interarrivals to data.

It will now be shown that the synthetic TCP connection arrivals are well-matched to the data both in terms of interarrival marginal and interarrival autocorrelation. FIG. 9 illustrates the match of the two marginal distributions to each other. A straight line would indicate a perfect fit. In fact, the plot is curved "downward," indicating that the marginal of the simulated interarrivals is slightly more extreme than that of the data. In agreement with Feldmann, supra, and Cao, et al., supra, the distributions of the data and model are well-described by Weibull distributions.

Figure 10:
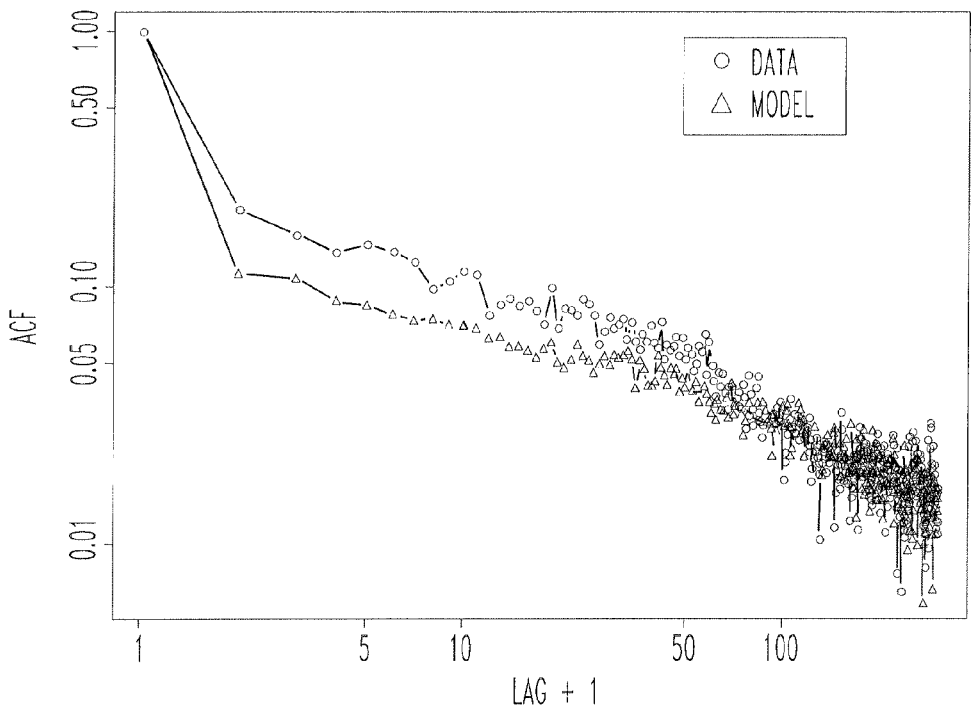
FIG. 10 illustrates a graphical representation of an empirical autocorrelation function of TCP connection interarrival sequence.

The autocorrelation of the actual and simulated interarrivals are shown in FIG. 10. Again the match is very good, though not exact. Because of the long-range dependence in the data, the empirical autocorrelation varies significantly from realization to realization.

Figure 11:
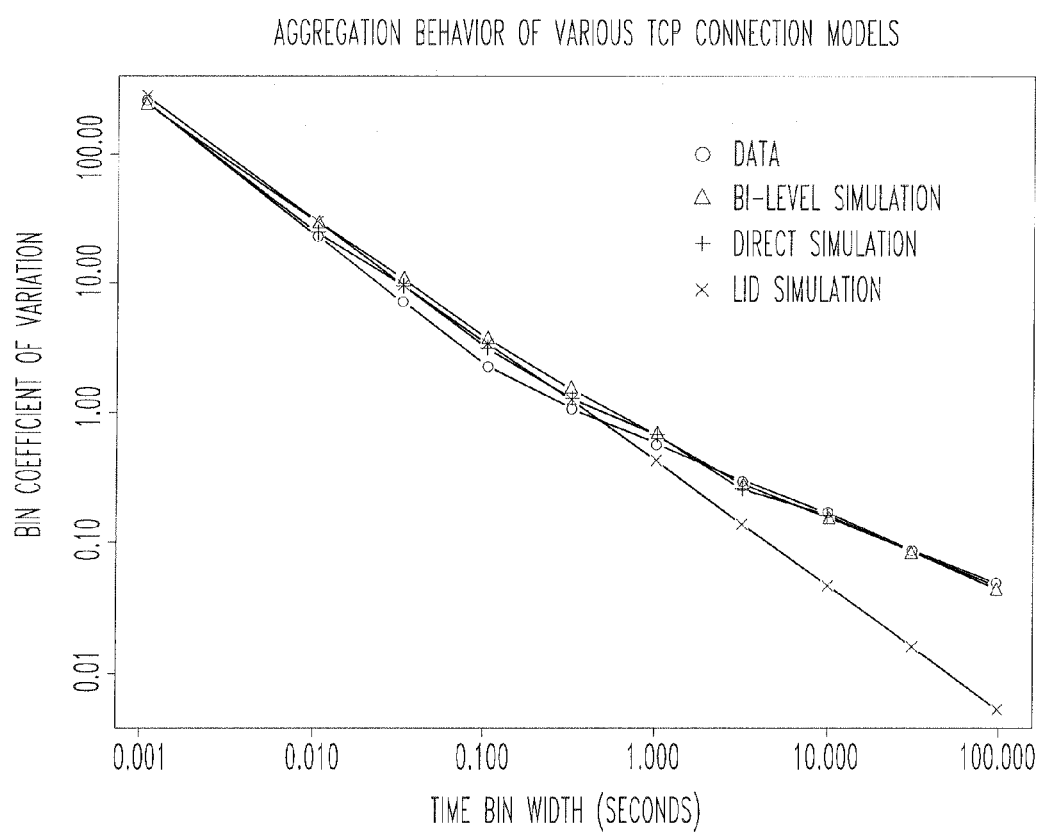
FIG. 11 illustrates a graphical representation of a square of the coefficient of variation for a TCP connection count process as a function of bin length, from data and various models.

A measure of the accuracy of the model across different scales is depicted in FIG. 11. FIG. 11 illustrates processes derived by counting the number of connections arriving in intervals of various durations. If the model matches the data well, the marginal distribution of the count process derived from the model should match that of the data on all time scales.

In FIG. 11, the square of the coefficient of variation of the count processes as a function of scale was measured. The line labeled "bi-level simulation" refers to the model. The line labeled "direct simulation" refers to a technique similar to that described in Cao, et al., supra, which directly matches the marginal and autocorrelation of the observed interarrival sequence. In the line marked "i.i.d. simulation," the arrival process is a renewal process with interarrival distribution matched to the data. The bi-level model and direct simulation are roughly equivalent in their ability to match the data in terms of aggregated coefficient of variation, while the i.i.d. simulation departs significantly from the data as the time scale increases. The coefficient of variation of the data has a dip at the 100 ms scale that is not reproduced by any of the three models.

Figure 12:
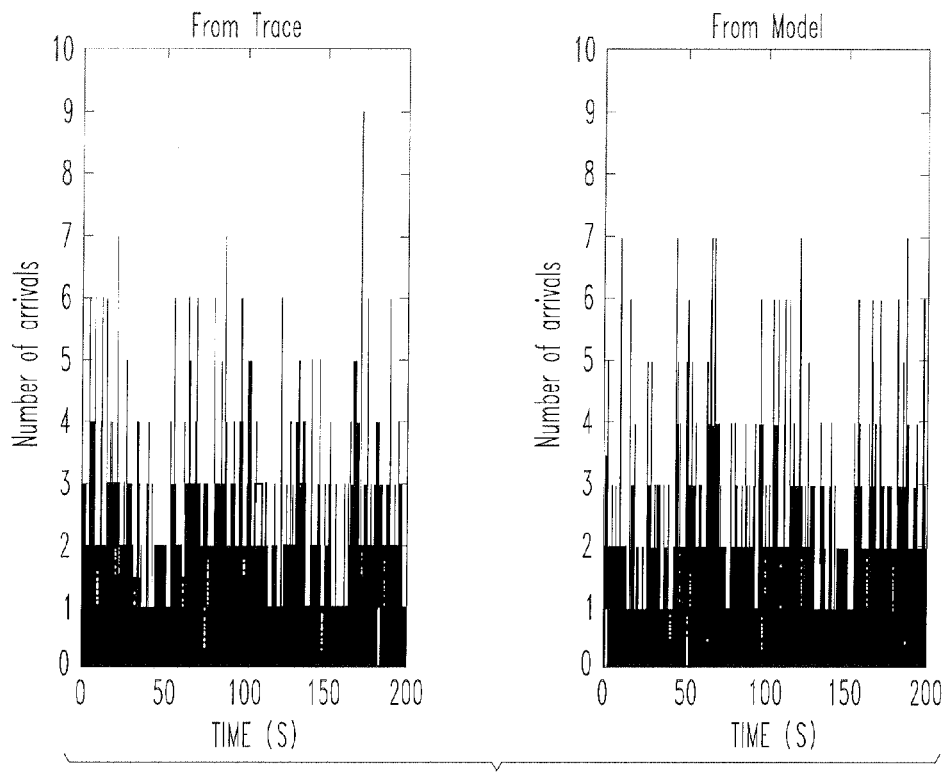
FIG. 12 illustrates a graphical representation of HTTP connection arrivals in 100 ms intervals.
Figure 13:
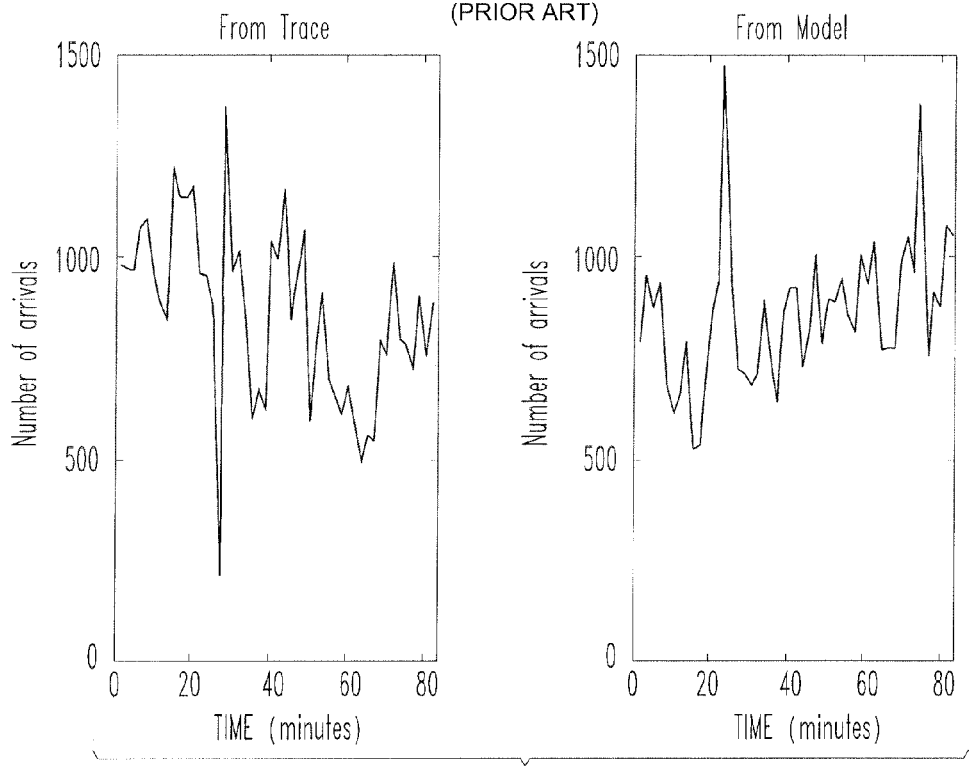
FIG. 13 illustrates a graphical representation of HTTP connection arrivals in 100 second intervals.

FIGS. 12 and 13 illustrate a visual comparison of the number of connection arrivals observed in the data compared to a trace generated by the synthesized procedure. Two time scales are depicted: one is a count of arrivals per 100 ms; the other is a count per 100 seconds. Qualitatively, the left half of each plot (data) looks identical to the right half (synthetic). This provides a visual way to check that the synthetic data does not have any glaring anomalies.

Generating synthetic TCP connection using the model is computationally efficient. The slowest part of the algorithm is sorting together the connections from different user sessions, which may require on the order of O(N logN) operations, N being the number of TCP connections.

The Effect of Spatial Aggregation

The proposed model captures the temporal aspects of TCP connections for data collected over a LAN. As shown in FIGS. 12 and 13, this corresponds to an average of (roughly) 10 TCP connections per second. It is desired to examine the validity of this model for wide area traffic consisting of, e.g., 10-40 gbps trunks carrying thousands of such connections per second. In the absence of explicit measurements from 10-40 gbps trunks carrying primarily data traffic, the effect of large-scale, or spatial, aggregation of TCP connections are examined as follows. First, spatial aggregates are synthesized from the existing data. Next, the temporal correlation structure of the resulting traces are examined, as measured by the Hurst parameter, and compared to that of the original trace. Then, the asymptotic variability of the aggregate trace is measured in terms of its coefficient of variation and its relationship to that of the LAN, the original trace, is shown. Finally, how the observed effects of large-scale aggregation are exhibited naturally in the proposed model is shown.

Synthesis of Spatial Aggregation. The technique of randomized shifts (see, both Erramilli, et al., references, supra) is used to create copies of the original trace which appear to be mutually independent, but whose correlation structures are virtually identically to the original trace. Each copy is generated by cutting the original trace at a random point and interchanging the beginning and ending segments. Multiple copies are then summed together to form the spatial aggregate. For this method to work most advantageously, the observation interval should be shorter than the total length of the trace. In the present discussion case, a trace consisting of about 100,000 counts, summed between 10 and 1000 shifted copies was taken, and the results observed on a segment of 2000 counts, as depicted in the left side of FIG. 14.

Figure 14A:
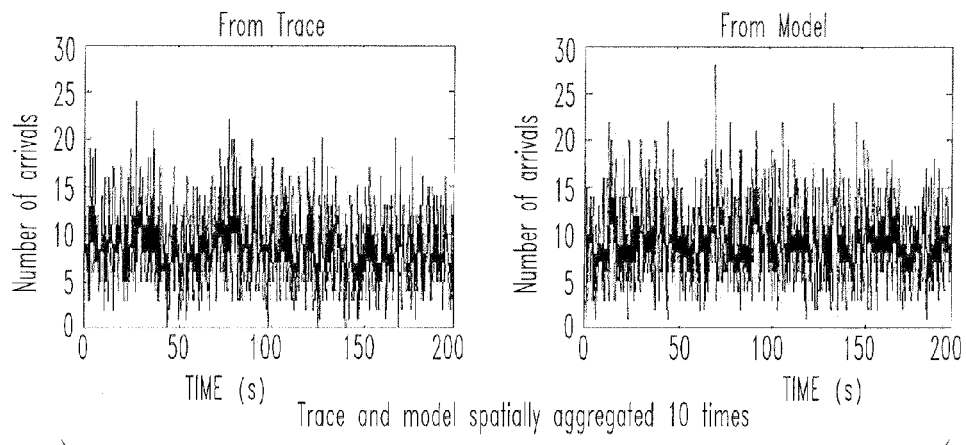
FIG. 14 illustrates a graphical representation of presumed counts over links.
Figure 14B:
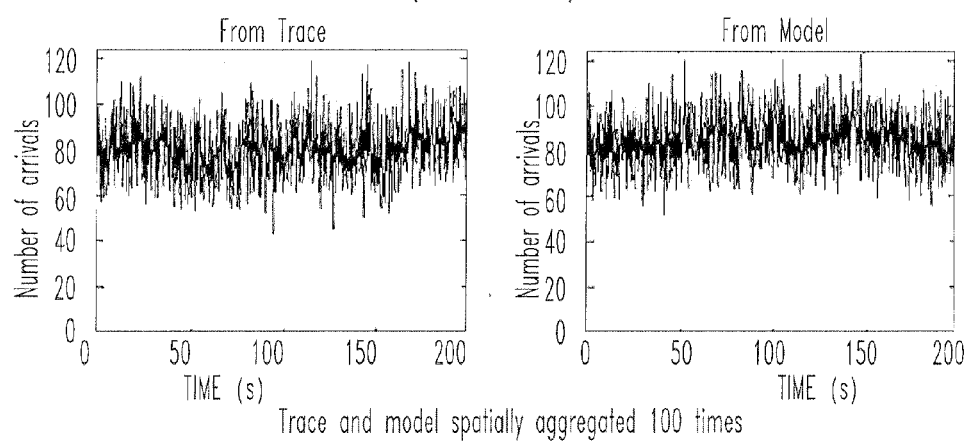
Figure 14C:
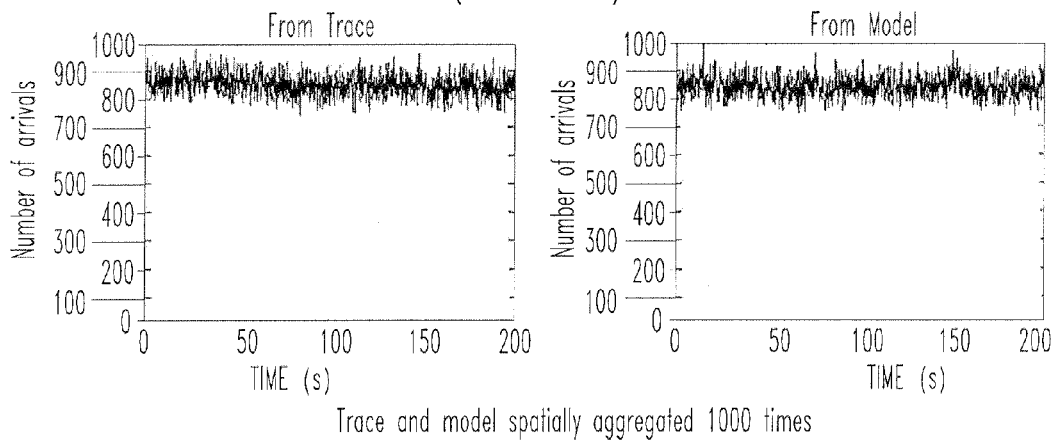

FIG. 14 shows estimates of the presumed counts over links carrying 10 to 1000 times more connections than the link analyzed above. On its right side, FIG. 14 shows corresponding counts generated from the compound model. The only difference between the model used in FIG. 12 and the models used in FIG. 14 is that the user session arrival rate n is increased by a factors of 10, 100 and 1000 in FIGS. 14A, 14B and 14C, respectively.

Figure 15:
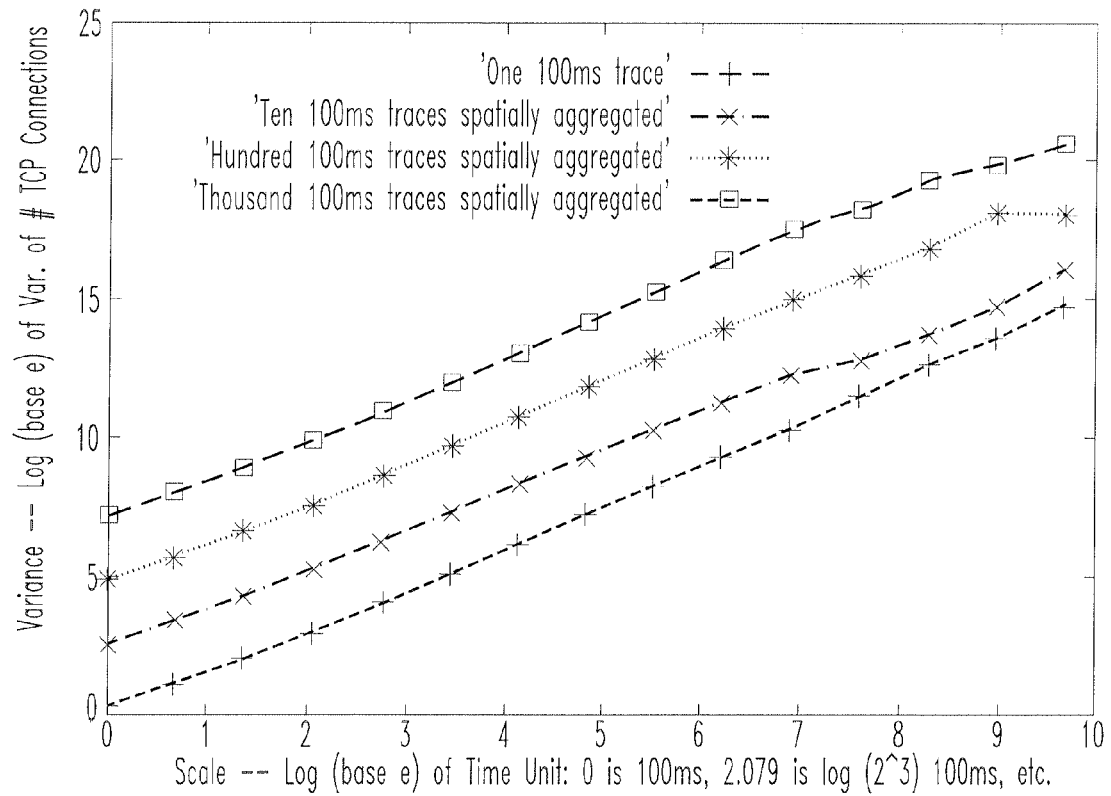
FIG. 15A-C illustrate variance-scale log-log plots for the original trace and for spatial aggregates by the factors 10, 100 and 1000, respectively.

Correlation Structure of Trace and Its Spatial Aggregate. FIG. 15 shows variance-scale log-log plots for the original trace and for spatial aggregates by the factors 10, 100 and 1000. The linearity of the plots indicates self-similar behavior, with the Hurst parameter H being proportional to the slope. The graph shows that the spatial aggregation procedure does not affect the value of the Hurst parameter, which is estimated to be 0.72±0.03 in all four cases.

Reduction in Coefficient of Variation without Change in H. An important characteristic of the spatial aggregation is increased smoothness, which is evident in FIGS. 12A-C. This is a manifestation of the law of large numbers. Let N denote the number of independent realizations of a count process that are summed to form an aggregate. The mean and variance of the marginal distribution of the aggregate process both scale linearly with N, so the coefficient of variation tends to zero as $N^{-1/2}$.

This highlights the importance of considering the autocorrelation amplitude as well as the decay exponent in evaluating the "strength" of long-range dependence. Even though all of the aggregates have the same Hurst parameter, the long-range dependence is more important in the traces with high coefficient of variation.

Comparing FIG. 13 with FIG. 14C demonstrates the difference between spatial and temporal aggregation. The coefficient of variation of a long-range dependent process falls more slowly under temporal aggregation than under spatial aggregation, because in the temporal case, the variables being aggregated are strongly correlated. For a short-term dependent process, the decay rate is the same in both cases.

General Framework

The model presented above is a special case of a more general approach that will be presented below. This framework includes the approach of Cox, supra, and Lowen, et al., "Power-law Shot Noise," IEEE Transactions on Information Theory, 36(6):1302-1318, November 1990, incorporated herein by reference, and like these models provides a link to the more familiar fractal models used in data networking (see, e.g., Leland, et al., supra; and Sherman, et al., supra).

A stochastic, instantaneous rate process for arrivals will now be constructed which will be used to modulate a point process, giving a doubly stochastic point process. This point process could be Poisson, as in Lowen, et al., "Doubly Stochastic Point Process Driven by Fractal Shot Noise," Physical Review A, 43(8):4192-4214, April 1990 (incorporated herein by reference), or a burstier renewal process, e.g., the process with Weibull interarrivals discussed above. Here, the focus is on properties of the modulating rate function.

Rate Process Construction

The rate process is constructed using a shot noise construction for which the roots go back as least as far as Rice, "Mathematical Analysis of Random Noise," Bell System Technical Journal, 23:1-51, 1945 (Reprinted in *Selected Papers on Noise and Stochastic Processes*, Wax, Ed. New York: Dover, 1954, pp. 133-294.); and Gilbert, et al., "Amplitude Distribution of Shot Noise," Bell Systems Technical Journal, 39:333-350, 1960, both incorporated herein by reference. In a general shot noise setting, events arrive in a Poisson stream with rate ν. Each arrival $A_i$ generates a pulse $h(t-A_i, X_i)$ parameterized by an i.i.d. sequence $\{X_i\}$ of random vectors which parameterize the pulses and which are independent of $\{A_i\}$.

The entire shot noise is a sum of pulses given by $$\lambda(t) = \sum_i h(t - A_i, X_i). \quad (1)$$

Some examples: Lowen, et al., supra, define fractal shot noise as $$h(t-A_i, X_i) = X_i f(t-A_i)$$

where $$f(t) = \begin{cases} ct^{\beta/2-1} & A < t < B \\ 0 & \text{otherwise} \end{cases}$$

Here $X_i$ is a scalar quantity that may be random or deterministic, and B may be infinite.

The power law decay in the impulse response of these shot noises leads to asymptotic long-range dependence and fractal behavior. These models are particularly appropriate for a variety of physical processes ranging from neuron firings and Cherenkov radiation from charged particles (see, e.g., both Lowen, et al., references, supra).

Figure 16:
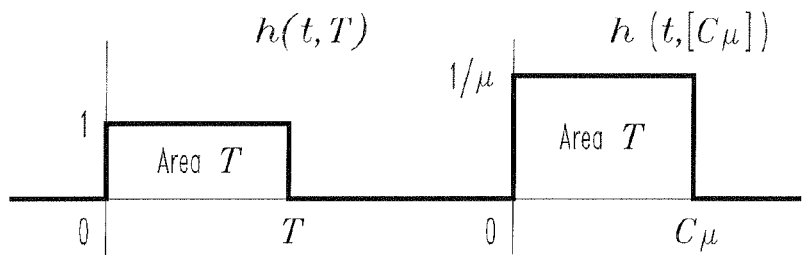
FIG. 16 illustrates graphical representations of shot noise impulse responses for the M/G/∞ queue and a generalization thereof.

In the case of computer traffic traces, long range dependence manifests itself in random distributions with power-law decay, rather than in slowly decaying impulse responses. If $X_i = T_i$ is a random time length parameter and h is the function $$h(t, T_i) = 1_{(0, T_i)}(t),$$

depicted on the left side of FIG. 16, the M/G/∞ "queue" is obtained. That is, λ(t) is the number of servers busy at time t when the arrival process is Poisson, $T_i$ is the random service time, and the number of active servers has no limit. When the distribution of the user session service times is heavy-tailed, long-range dependence is induced in λ(t).

In the traffic analysis described above, it was noted that different users generated traffic at widely different rates. It was also observed that to first order the average interarrival time for connections within a user session was independent of the total amount of traffic generated by the user session.

$X_i$ is defined as follows. $X_i = (C_i, \mu_i)$, where $C_i$ is the amount of traffic generated by the user session and $\mu_i$ is the expected time between traffic events generated by that session, and where the variables $C_i$ and $\mu_i$ are independent of one another. Then the impulse response corresponding to the model given above is $$h(t, (C_i, \mu_i)) = \frac{1}{\mu_i} 1_{(0, \mu_i C_i)}(t).$$

As depicted in FIG. 16, each user session consists of a rate rectangle of height $1/\mu_i$, width $C_i \mu_i$ and area $C_i$. Note that if $\mu_i = \mu$ is a deterministic constant, this model reduces to the M/G/∞ case.

The way in which the distributions of $C_i$ and $\mu_i$ affect the autocorrelation $r_\lambda(t)$ of the rate process λ(t) is of interest. How heavy tailed distributions give rise to long range dependence in λ(t) is of particular interest.

Mean and autocorrelation of λ(t)

Suppose that for shot noise given by equation (1), the impulse response h is deterministic, i.e., does not depend on $X_i$. Then, by Rice, supra, the mean and autocorrelation of λ(t) are given by $$\bar{\lambda} = E\{\lambda(t)\} = \nu \int_{-\infty}^{\infty} h(t) dt$$

and $$r_\lambda(\tau) = E\{(\lambda(t)-\bar{\lambda})(\lambda(t+\tau)-\bar{\lambda})\} = \nu \int_{-\infty}^{\infty} h(t) h(t+\tau) dt$$

When h(t) is a rectangular pulse of fixed height $1/\mu$ and area C, the mean is $\bar{\lambda}=vC$ and the autocorrelation is $$r_\lambda(\tau) = \begin{cases} v\frac{1}{\mu}\left(C - \frac{|\tau|}{\mu}\right) & |\tau| < \mu C \\ 0 & \text{else} \end{cases}.$$

Suppose that there are n independent deterministic shot noises with parameters $n_i$, $\mu_i$ and $C_i$. Suppose also that $Ev_i=v$. Then summing the shot noises together produces an equivalent random shot noise, in which the parameters $(\mu_i, C_i)$ are drawn with probability $v_i/v$ for each arrival.

Due to the independence of the shot noises, the means and autocorrelations sum. In the limit of large n, $\mu$ and C can be thought of as having a given continuous joint distribution, and the mean and autocorrelation can be obtained via integration. Specifically, $$\bar{\lambda}=vE\{C\}=v\int_0^\infty p(C)CdC$$

and $$r_\lambda(\tau) = vE\left\{\frac{1}{\mu}\left(C - \frac{|\tau|}{\mu}\right)^+\right\} = v\int_0^\infty \int_0^\infty p(\mu, C)\frac{1}{\mu}\left(C - \frac{|\tau|}{\mu}\right)^+ d\mu dC \quad (2)$$

where $p(C)$ and $p(\mu,C)$ are probability distribution functions. Note that $r_\lambda(0)=vE\{C/\mu\}$, or in case C and $\mu$ are independent, $r_\lambda(0)=vE\{C\}E(1/\mu)\}$.

Long-range Dependence

Heavy-tailed random distributions of $\mu$ and C can lead to long-range dependence in the autocorrelation of $\lambda(t)$. Cox, supra, analyzed this relationship for the M/G/$\infty$ queue, i.e., for $\mu=1$ and random C, showing that $x^\alpha$ behavior in the tail distribution of C leads to $t^{1-\alpha}$ behavior in the autocorrelation of the queue size. To be more precise, a "regularly varying function U with parameter p" is defined as a function which satisfies $$\lim_{t\to\infty}\frac{U(xt)}{U(t)} = x^p$$

for all x>0. For a general discussion of regularly varying functions, see, e.g., Bingham, et al., *Variation*, Cambridge University Press, Cambridge, 1987; Feller, *An introduction to Probability Theory and Its Applications*, volume II, Wiley, New York, 2d edition, 1971; and Resnick, *Extreme Values, Regular Variation, and Point Processes*, Springer-Verlag, New York, 1986.

If p=0, U is referred to as a "slowly varying function." It turns out that each regularly varying function can be written in the form $U(t)=t^p L(t)$, where L is slowly varying. Examples of slowly varying functions include functions with finite, non-zero limits and powers of logt. Cox's result states that if the complementary distribution function $\bar{F}_C(x)$ of C is regularly varying with finite mean, i.e., if $$\bar{F}_C(x)=x^{-\alpha}L(x)$$

for any $\alpha>1$ and slowly-varying function L(x), then the autocorrelation function of the queue size process is $$r_\lambda(\tau)=v\int_\tau^\infty P(C)(C-\tau)dC=v\int_\tau^\infty \bar{F}_C(C)dC=\tau^{1-\alpha}L^*(\tau)$$

where L* is a slowly varying function. If $1<\alpha<2$, then $r_\lambda(\tau)$ is unsummable, and hence the rate process is long-range dependent.

In the case that both C and $\mu$ are random, it turns out that power-law tails in either C or $\mu$ can lead to power-law decay in $r_\lambda$. As an illustrative example, consider the case in which C is Pareto($\alpha$,1), $\mu$ is Pareto($\beta,\mu_0$), and C and $\mu$ are mutually independent. After evaluating equation (2), the autocorrelation turns out to be $$r_\lambda(t) = \frac{v}{\mu_0}\left(\frac{\alpha\beta}{(\alpha-1)(\beta+1)} - \frac{\beta}{\beta+2}\frac{t}{\mu_0}\right)$$

for $|t|\leq\mu_0$ and $$r_\lambda(t) = \frac{v\beta}{\mu_0(\alpha-1)(\beta+2-\alpha)}\left(\frac{t}{\mu_0}\right)^{1-\alpha} + \frac{v\alpha\beta}{\mu_0(\beta+1)(\beta+2)(\alpha-\beta-2)}\left(\frac{t}{\mu_0}\right)^{-\beta-1}$$

for $|t|\geq\mu_0$. If $\alpha-1<\beta+1$, then the autocorrelation decays with exponent $\alpha-1$. If the inequality is reversed, the autocorrelation decays with exponent B+1. As in the M/G/$\infty$ queue, long-range dependence is induced whenever $1<\alpha<2$. The following theorem shows that these observations can be generalized to distributions with regularly varying tail distributions.

To simplify the statement of the theorem, the following function is defined $$G(t) = \int_t^\infty \frac{1}{\mu}dF_\mu(u). \quad (3)$$

When $F_\mu$ is regularly varying with parameter $-\beta$, G is regularly varying with parameter $-\beta-1$. Also, the Mellin transform of a function f is denoted by $$\tilde{f}(z)=\int_0^\infty t^{-z}f(t)dt/t$$

Further, the relationship $$\lim_{t\to\infty}\frac{f(t)}{g(t)} = 1$$

is denoted by $f(t)\sim g(t)$.

Theorem: Suppose that C and $\mu$ are independent random variables with tail distributions $\bar{F}_C$ and $\bar{F}_\mu$, and that $E\{1/\mu\}<\infty$.

I. Suppose that $\bar{F}_C$ varies regularly with parameter $-\alpha<-1$, and that $\bar{F}_\mu$ is bounded by a regularly varying function with parameter $-\beta<-1$, where $\alpha-1<\beta+1$. Then $$r_\lambda(t)\sim t\bar{F}_C(t)\tilde{G}(1-\alpha),$$

and $r_\lambda(t)$ is regularly varying with parameter $1-\alpha$.

II. Suppose that $\bar{F}_\mu$ varies regularly with parameter $-\beta<-1$, and that $\bar{F}_C$ is bounded by a regularly varying function with parameter $-\alpha<-1$, where $\beta+1<\alpha-1$. Then $$r_\lambda(t)\sim G(t)\tilde{\bar{F}}_C(-\beta-2),$$

and $r_\lambda(t)$ is regularly varying with parameter $-\beta-1$.

BiPareto distributions have regularly varying tail distributions, and hence rate and count processes based on biPareto C and μ will have regularly varying autocorrelation functions. In practice, it is important to keep in mind that observations have a limited temporal range. If the regularly varying behavior of C and μ is only in the extreme tail, then the regular variation induced in the autocorrelation may not be apparent at time scales of practical interest.

The second-order temporal structure of a point process is specified by its co-occurrence function. In the case of a doubly stochastic Poisson process, this function is proportional to the autocorrelation of the rate function (Lowen, et al., supra).

For count processes derived from the point process, the autocorrelation is closely related to the co-occurrence function and typically has the same asymptotic decay. Hence long-range dependent rate functions λ(t) lead to long-range dependent arrival count processes. Under sufficient levels of aggregation, any such count process eventually approaches the usual fractional Brownian motion model.

Other Properties

As the theorem above shows, the shot noise rate function described herein leads to such a long-range dependent process whenever C is heavy-tailed with parameter $1<\alpha<2$. However, the model retains a great deal of flexibility in the distributions of μ and C, even after the parameter α is fixed. These distributions determine the remaining properties of the rate function, including the marginal distribution, short-term correlation properties, and the amplitude of the slowly decaying autocorrelation tail. For example, a continuous distribution on μ leads to a continuous marginal distribution for the rate function. If very small values of μ are allowed, the variance of the rate function increases with $E\{1/\mu\}$, and the short-term auto correlation may also change shape. While the tail densities of C and μ determine the Hurst parameter of the rate process, its coefficient of variation is controlled by the arrival rate ν of the Poisson process of user session arrivals. Specifically, $$\frac{(r_\lambda(0))^{1/2}}{\bar{\lambda}} = \nu^{-1/2} \frac{E\{(C/\mu)\}^{1/2}}{E\{C\}}$$

Increasing ν corresponds exactly to increasing the level of spatial aggregation, as discussed above. As the population generating rate events increases, the relative fluctuations in total rate become smaller.

The distributions of μ and C also determine the properties of the interarrival processes corresponding to point processes modulated by λ(t). Although the count processes obtained from these point processes inherit properties such as long range dependence directly from the rate process, the relationship between the statistics of the rate process and those of the inter-arrival sequence is substantially more complex. For example, the second order statistics of λ(t) are not sufficient to determine even the marginal distribution of the interarrival process (see, e.g., Cox, et al., supra).

CONCLUSIONS

The compound, shot noise approach appears to be a useful and flexible modeling method. The distributions of parameters such as μ and C can be estimated based on empirical measurements, as described above, or based on system knowledge and experience. Once the distributions are fixed, the model automatically reproduces complex point process behavior, including long-range dependence counts and bursty interarrivals. In Willinger, et al., ("Self-similarity and Heavy Tails: Structural Modeling of Network Traffic," in *A Practical Guide to Heavy Tails: Statistical Techniques and Applications*, pages 27-53, Birkhauser, Boston, 1998, a complexity/flexibility tradeoff is noted between Cox's model, supra, and Kurtz's model (Kurtz, "Limit Theorems for Workload Input Models," in *Stochastic Networks: Theory and Applications*, Clarendon Press, Oxford, 1996. Generalizing Cox's model along the lines described herein provides an intermediate point in this tradeoff spectrum.

One final observation relates to a point made above. The smoothing effect observed through large-scale synthesis, as well as that predicted by the analytical model, has a significant impact on traffic engineering issues. Variability around the mean is substantial for LAN data traffic, and good traffic engineering needs to take account of these unusually large fluctuations. However, for very large aggregates, such as those in wide area traffic, as in the core of networks, the variability is considerably reduced. This reduction substantially simplifies the traffic engineering problem for Wide-Area Networks (WANs) and implies that high utilizations are feasible regardless of the short or long term temporal correlations in the traffic.

Although the present invention has been described in detail, those skilled in the art should understand that they can make various changes, substitutions and alterations herein without departing from the spirit and scope of the invention in its broadest form.

What is claimed is:

1. A computer-readable medium having stored thereon a plurality of instructions including instructions that when executed by a processor cause said processor to implement a system for dynamically simulating transmission control protocol (TCP) traffic loads of types that may include, but are not limited to, Hypertext Transfer Protocol (HTTP) traffic in a wide-area network in user-defined epochs having a duration t which is less than a duration for a user session, said system comprising:

an initial arrival generator that generates an initial arrival for a simulated user session during an initial epoch at an independent time from a previous user session arrival in said wide-area network; and a subsequent arrival generator that dynamically provides a prediction of a sequence of connection arrivals for subsequent epochs, said subsequent arrival generator associated with said initial arrival generator which generates a number of connections to be associated with said simulated user session during said initial epoch as an independent variable and, if said number of connections is greater than one, generates a mean connection interarrival time for said simulated user session during said initial epoch and a plurality of timings of subsequent connection arrivals.

2. The computer-readable medium as recited in claim 1 wherein said time is an exponentially distributed time.

3. The computer-readable medium as recited in claim 1 wherein said subsequent arrival generator generates said number of connections as an independent random biPareto variable.

4. The computer-readable medium as recited in claim 1 wherein said plurality of timings numbers one less than said number of connections.

5. The computer-readable medium as recited in claim 1 wherein said plurality of timings are independent Weibull random variables.

6. The computer-readable medium as recited in claim 1 wherein a number of said user-defined epochs is not determined prior to said user session.

7. The computer-readable medium as recited in claim 1 wherein at least one system parameter in one of said user-defined epochs differs from at least one system parameters in an other of said user-defined epochs.

8. A computer-implemented method of dynamically simulating transmission control protocol (TCP) traffic loads of types that may include, but are not limited to, Hypertext Transfer Protocol traffic in a wide-area network in user defined epochs having a duration t which is less than a duration for a user session, said method comprising:
- generating an initial arrival for a simulated user session during an initial epoch at an independent time from a previous user session arrival in said wide-area network;
- generating a number of connections to be associated with said simulated user session during said initial epoch as an independent variable; and
- providing a dynamic prediction of a sequence of connection arrivals for subsequent epochs by generating a mean connection interarrival time for said simulated user session during said initial epoch and a plurality of timings of subsequent connection arrivals if said number of connections is greater than one.

9. The method as recited in claim 8 wherein said time is an exponentially distributed time.

10. The method as recited in claim 8 wherein said generating said number of connections comprises generating said number of connections as an independent random biPareto variable.

11. The method as recited in claim 8 wherein said plurality of timings numbers one less than said number of connections.

12. The method as recited in claim 8 wherein said plurality of timings are independent Weibull random variables.

13. The method as recited in claim 8 wherein said plurality of timings are scaled to conform to a period of time.

14. The method as recited in claim 8 further comprising generating subsequent arrivals based on a sorted list of said plurality of timings.

15. A computer-readable medium having stored thereon a plurality of instructions including instructions that when executed by a processor cause said processor to implement a system for dynamically simulating transmission control protocol (TCP) traffic loads of types that may include, but are not limited to, Hypertext Transfer Protocol (HTTP) traffic in a wide-area network during user defined epochs having a duration t which is less than a duration for a user session, said system comprising:
- an initial arrival generator that generates initial arrivals for a simulated user session during an initial epoch at an independent, exponentially distributed time from previous user session arrivals wherein a rate of said user session arrivals corresponds to a wide-area network; and
- a subsequent arrival generator that dynamically provides a sequence of connection arrivals for subsequent epochs, said subsequent arrival generator associated with said initial arrival generator which generates a number of connections to be associated with said simulated user sessions during said initial epoch as an independent variable and, if said number of connections is greater than one, generates a mean connection interarrival time for said simulated user sessions during said initial epoch and a plurality of timings of subsequent connection arrivals, said subsequent arrival generator generating subsequent arrivals based on a sorted list of said plurality of timings.

16. The computer-readable medium as recited in claim 15 wherein said subsequent arrival generator generates said number of connections as an independent random biPareto variable.

17. The computer-readable medium as recited in claim 15 wherein said plurality of timings numbers one less than said number of connections.

18. The computer-readable medium as recited in claim 15 wherein said plurality of timings of subsequent arrivals are generated based on a spatial aggregation of said previous user session arrivals.

19. The computer-readable medium as recited in claim 18 wherein said spatial aggregation is formed from a summation of multiple copies of an original trace of a user session whose rate of arrivals corresponds to a local area network, said copies generated by cutting said original trace at a random point and interchanging beginning and ending segments.

20. The computer-readable medium as recited in claim 15 wherein said system incorporates an algorithm that generates a point process of events for modeling Transmission Control Protocol (TCP) connections.

* * * * *